United States Patent
Mori et al.

(10) Patent No.: US 11,233,793 B2
(45) Date of Patent: *Jan. 25, 2022

(54) SYSTEM FOR DATA SET TRANSLATION OF ACCOUNTS

(71) Applicant: Visa International Service Association, San Francisco, CA (US)

(72) Inventors: Michael Mori, San Mateo, CA (US); Gourab Basu, Half Moon Bay, CA (US); Rajat Das, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/801,734

(22) Filed: Feb. 26, 2020

(65) Prior Publication Data

US 2020/0195644 A1    Jun. 18, 2020

Related U.S. Application Data

(63) Continuation of application No. 16/327,229, filed as application No. PCT/US2016/059416 on Oct. 28, 2016, now Pat. No. 10,616,223.

(51) Int. Cl.
*H04L 29/06* (2006.01)
*H04L 9/32* (2006.01)
(Continued)

(52) U.S. Cl.
CPC ..... *H04L 63/0884* (2013.01); *G06Q 20/3278* (2013.01); *G06Q 20/40* (2013.01);
(Continued)

(58) Field of Classification Search
CPC . H04L 63/0884; H04L 9/3226; H04L 9/3297; G06Q 20/40; G06Q 20/3278; G06Q 20/4018; H04W 12/12; H04W 12/06
See application file for complete search history.

(56) References Cited

U.S. PATENT DOCUMENTS 10,616,223 B2 * 4/2020 Mori ............... H04L 9/3297
10,769,599 B2 * 9/2020 Sobolevski .......... G06Q 20/401
(Continued)

FOREIGN PATENT DOCUMENTS

CN    101146108 A    3/2008
CN    102792325 A    11/2012
(Continued)

OTHER PUBLICATIONS

Application No. EP16920013.6, Extended European Search Report, dated Jun. 3, 2020, 8 pages.
(Continued)

*Primary Examiner* — Thaddeus J Plecha
(74) *Attorney, Agent, or Firm* — Kilpatrick Townsend & Stockton LLP

(57) ABSTRACT

Systems and methods are described that allow users to continue utilizing their user accounts and user devices associated with a first authorization entity for transactions conducting with a second authorization entity. A processor server computer may translate a first data set including first account identifier and a first verification value associated with a first authorization entity during authorization processing into a second data set including a second account identifier and a second verification value that can be processed by a second authorization entity. The processor server computer may modify an authorization request message based on the translated data set. The processor server computer may also enable the authorization request message to be routed to an appropriate authorization entity during authorization processing.

20 Claims, 5 Drawing Sheets

(51) Int. Cl.
*G06Q 20/40* (2012.01)
*G06Q 20/32* (2012.01)
*H04W 12/06* (2021.01)
*H04W 12/12* (2021.01)

(52) U.S. Cl.
CPC ....... *G06Q 20/4018* (2013.01); *H04L 9/3226* (2013.01); *H04L 9/3297* (2013.01); *H04W 12/06* (2013.01); *H04W 12/12* (2013.01)

(56) References Cited

U.S. PATENT DOCUMENTS

| | | | |
|---|---|---|---|
| 2001/0032192 A1 | 10/2001 | Putta et al. | |
| 2003/0069857 A1 | 4/2003 | Junda | |
| 2008/0306850 A1 | 12/2008 | Horvath et al. | |
| 2009/0292642 A1 | 11/2009 | Han | |
| 2010/0123003 A1 | 5/2010 | Olson et al. | |
| 2011/0125642 A1 | 5/2011 | Kamal | |
| 2013/0036037 A1* | 2/2013 | Meredith | H04W 4/02 705/35 |
| 2013/0212026 A1 | 8/2013 | Powell et al. | |
| 2014/0067683 A1 | 3/2014 | Varadarajan | |
| 2014/0279500 A1* | 9/2014 | Larko | G06Q 30/016 705/44 |
| 2015/0046340 A1 | 2/2015 | Dimmick | |
| 2015/0161612 A1 | 6/2015 | Parento et al. | |
| 2015/0178693 A1* | 6/2015 | Solis | G06Q 20/027 705/30 |
| 2015/0264180 A1* | 9/2015 | Wolthuis | H04M 3/5175 379/265.12 |
| 2016/0247141 A1 | 8/2016 | Graylin et al. | |
| 2016/0314467 A1 | 10/2016 | Bonalle et al. | |
| 2017/0286926 A1* | 10/2017 | Carlson | G06Q 20/10 |
| 2018/0082298 A1* | 3/2018 | Modi | H04L 63/083 |
| 2018/0114203 A1* | 4/2018 | Senci | G06F 21/6245 |

FOREIGN PATENT DOCUMENTS

| | | |
|---|---|---|
| CN | 105453524 A | 3/2016 |
| WO | 2010126509 | 11/2010 |
| WO | 2015168333 | 11/2015 |
| WO | 2016134016 | 8/2016 |
| WO | 2018080518 | 5/2018 |

OTHER PUBLICATIONS

U.S. Appl. No. 16/327,229 , "Non-Final Office Action", dated Jul. 3, 2019, 14 pages.

U.S. Appl. No. 16/327,229 , "Notice of Allowance", dated Nov. 25, 2019, 9 pages.

PCT/US2016/059416 , "International Preliminary Report on Patentability", dated May 9, 2019, 6 pages.

PCT/US2016/059416 , "International Search Report and Written Opinion", dated Jul. 25, 2017, 9 pages.

CN201680090299.1 , "Office Action", dated Oct. 8, 2021, 18 pages.

\* cited by examiner

SYSTEM FOR DATA SET TRANSLATION OF ACCOUNTS

CROSS-REFERENCES TO RELATED APPLICATIONS

This application is a continuation application of U.S. application Ser. No. 16/327,229, on Feb. 21, 2019, which is a national stage application of U.S. National Phase of PCT Application No. PCT/US2016/059416, filed Oct. 28, 2016, the disclosure of which are incorporated by reference.

BACKGROUND

Data associated with user accounts that is utilized for conducting authorization processes processed by an authorization entity typically cannot be utilized for conducting authorization processes with other authorization entities. This is because the data may include information specific to the authorization entity with which it is meant to be utilized. As a result, when the responsibilities of managing authorization processing for a group of user accounts is shifted from one authorization entity to another authorization entity, the data utilized with the original authorization entity can become obsolete. This is cumbersome, since the users may have to perform re-registration processes to enable generation of new data that can be utilized by the new authorization entity. This can be especially frustrating because such a shift, in many instances, can occur unbeknownst to the users.

In an exemplary case, a portfolio of card accounts originally issued by a first authorization computer may be transferred to a second authorization computer. In some cases, this transfer may be performed without knowledge by the users of the cards. Card numbers associated with the cards typically include an identifier, which may be known as a bank identification number (BIN), corresponding to the first authorization computer that issued the cards and are meant to authorize transactions conducted utilizing the card numbers. However, after the card accounts are transferred to the second authorization computer, their corresponding card numbers still indicate that they should be routed to the first authorization computer. To remedy this issue, the second authorization computer typically reissues the whole portfolio of card accounts to generate new accounts and corresponding plastics cards, which is inconvenient and a waste of resources.

Hence, conventional methods do not enable an effective way to address situations in which changes to authorization entities handling authorization processing for a certain group of user accounts occur. For example, re-registration processes for registering users with a new authorization entity can result in data originally utilized for authorization processes with one authorization entity to be completely replaced. Further, any additional information that may have been associated with the replaced data can be lost as well. Hence, there is a need to enable a smoother transition when dealing with changes to authorization entities conducting authorization processing.

Embodiments of the invention address this and other problems, individually and collectively.

BRIEF SUMMARY

Embodiments of the present invention relate to systems and methods for enabling authorization information to be utilized to conduct a transaction regardless of a change of an authorization entity that processes the transaction. These systems and methods can allow users to keep utilizing their authorization information without having to conduct additional registration processes. Further, these systems and methods can enable security information associated with the authorization information to be continued to be utilized for conducting transactions, which is beneficial.

According to one embodiment of the invention, a method may be performed by a server computer. The method may comprise receiving, from an access device, an authorization request message with a first data set comprising a first verification value and a first account identifier corresponding to a first authorization computer. The method may further comprise determining that the first data set is associated with a second data set comprising a second account identifier corresponding to a second authorization computer of a second authorization entity. In some embodiments, the first account identifier includes a first authorization entity identifier associated with the first authorization entity and the second account identifier includes a second authorization entity identifier associated with the second authorization entity.

The method may further comprise verifying the first verification value and generating a second verification value associated with the second data set. In some cases, verifying the first verification value may comprise receiving the first verification value, generating a verification value using at least the first account identifier, and determining that the first verification value and the generated verification value match.

The method may further comprise routing, to the second authorization computer, the authorization request message with the second data set comprising the second verification value. In some embodiments, the second authorization computer may validate the authorization request message based on the second verification value. In some cases, routing the authorization request message may comprise obtaining the second account identifier and determining the second authorization entity identifier included in the second account identifier. Routing the authorization request message may further comprise determining that the second authorization entity identifier is associated with the second authorization entity and routing the authorization request message to the second authorization entity.

In some implementations, the verification values can be generated using various information. For example, the first verification value may be generated using an encryption key associated with the first authorization entity. The second verification value may be generated using an encryption key associated with the second authorization entity. In some cases, the first verification value and the second verification value can be one of a card verification value, a PIN, or an authorization request cryptogram.

In some embodiments, the method may further comprise generating the second data set comprising the second account identifier corresponding to the second authorization computer and storing the second data set in association with the first data set in a database. The database may comprise a mapping between data sets corresponding to the first authorization computer and data sets corresponding to the second authorization computer.

In some embodiments, the method may further comprise some steps performed after receiving the authorization request message. For example, the method may further comprise accessing the database comprising the mapping between data sets corresponding to the first authorization entity and data sets corresponding to the second authorization entity. The method may further comprise querying the database for the first data set and receiving from the database an indication that the first data set is associated with the second data set.

In some embodiments, the method may further comprise accessing a database comprising fraud information associated with the first data set. The method may further comprise retrieving the fraud information associated with the first data set upon determining that the first data set is associated with the second data set. The method may further comprise sending the fraud information related to the first data set with the authorization request message to the second authorization computer. The second authorization computer may utilize the fraud information to determine whether to validate the authorization request message.

Embodiments of the invention are further directed to a server computer comprising a processor and a memory element. The memory element (e.g., computer-readable medium) can comprise code, executable by the processor, for implementing methods described herein.

DETAILED DESCRIPTION

Figure 1:
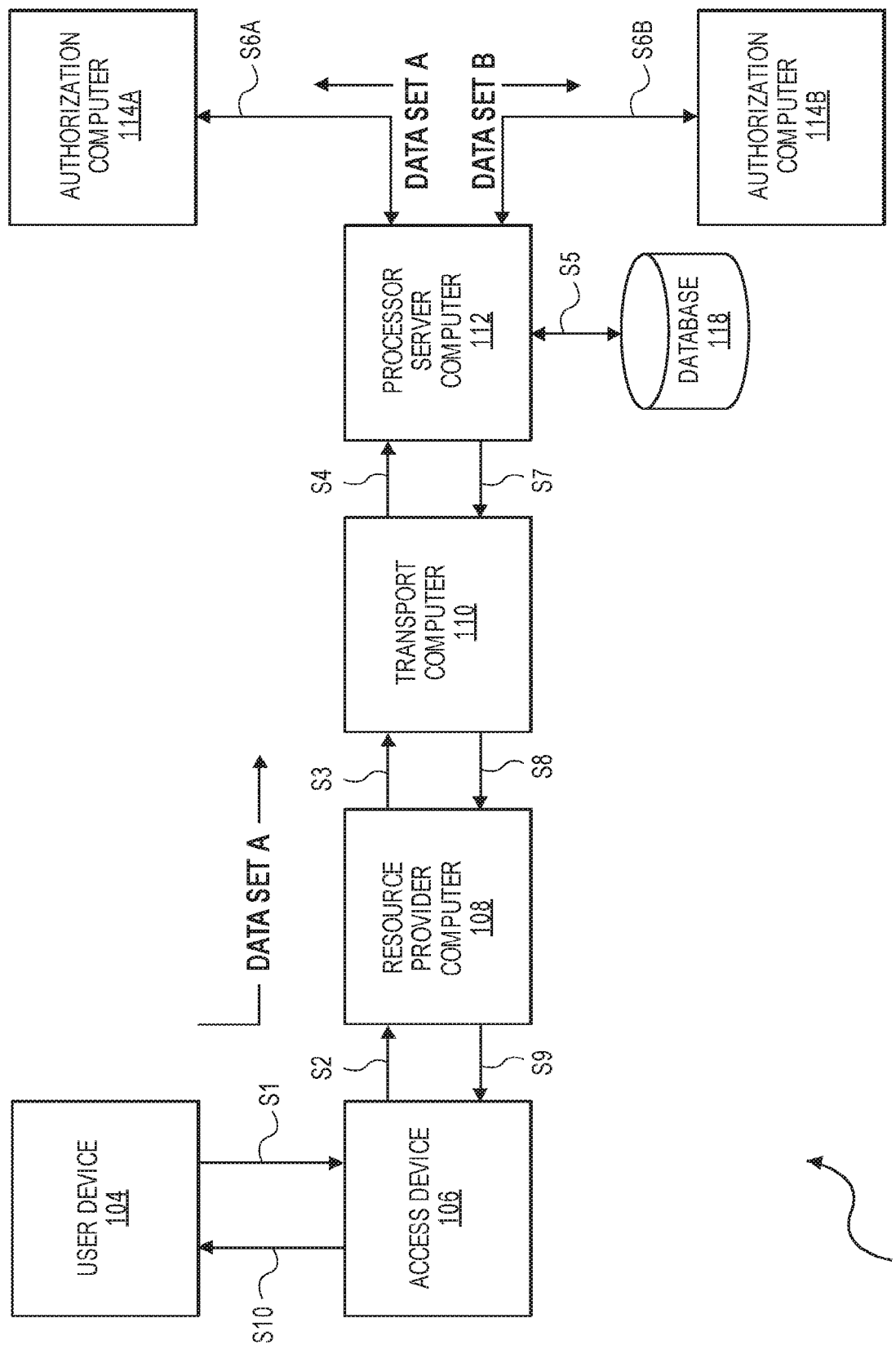
FIG. 1 shows a block diagram of an exemplary system according to embodiments of the present invention.

Embodiments of the present invention relate to systems and methods for enabling account information associated with a first authorization entity to be utilized to conduct a transaction being authorized by a second authorization entity. These systems and methods can allow users to keep utilizing their user devices and corresponding accounts as usual without having to conduct additional re-registration processes or obtaining new user devices when their account is reissued to the second authorization entity. A processor server computer can translate a first data set processed with an authorization request message during a transaction so that the authorization request message is modified to include a second data set. Additional security values may be translated by the processor server computer during the transaction.

Before discussing specific embodiments and examples, some descriptions of terms used herein are provided below.

A "data set" may be any suitable set of information. In some embodiments, a data set may be sent with an authorization request message and may include an account identifier and a verification value. In an exemplary case, the data set may be utilized for a payment card transaction, where the account identifier may be a card account number and the verification value may be a card verification value (CVV).

An "account identifier" may be any suitable identifier indicating an account. In some cases, the account identifier may be a card account number associated with a card account. In other cases the account identifier may be a username, email address, phone number, or other information that may indicate an account.

A "verification value" may be any value that is validated. In some cases, the verification value may be associated with an account and may be verified prior to access or use of the account. In an exemplary case, the verification value may be a CVV, which may be verified so that a corresponding card account number may be utilized to conduct a transaction. Other verification values include a CVV2, dynamic card verification value (dCVV), cardholder authentication verification value (CAVV), authorization request cryptogram (ARQC), authorization response cryptogram (ARPC), and PIN number.

An "authorization request message" may be an electronic message that requests authorization. For example, the authorization request message may be sent to a processing network (e.g., payment processing network) and/or an authorization computer (e.g., issuer) of a payment card to request authorization for a transaction. An authorization request message according to some embodiments may comply with (International Organization of Standardization) ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, and the like. An authorization request message may also comprise "transaction information," such as any information associated with a current transaction, such as the transaction amount, merchant identifier, merchant location, etc., as well as any other information that may be utilized in determining whether to identify and/or authorize a transaction. In some embodiments, the authorization request message may comprise anonymized user data.

An "authorization response message" may be an electronic message reply that indicates authorization status. For example, the authorization response message may be a reply to an authorization request message generated by an issuing financial institution or a processing network (e.g., payment processing network). The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network) to the access device (e.g. POS equipment), associated with a resource provider computer (e.g., merchant) that indicates approval of the transaction. The code may serve as proof of authorization. As noted above, in some embodiments, a processing network may generate or forward the authorization response message to the resource provider computer (e.g., merchant computer).

A "token" may include a substitute identifier for some information. A token may be a string of numbers, letters, or any other suitable characters. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "resource provider" may be an entity that can provide a resource such as goods, services, information, and/or access. Examples of a resource provider include merchants, access devices, secure data access points, etc. In some cases, the resource provider may operate a physical store and utilize an access device for in-person transactions. The resource provider may also sell goods and/or services via a website, and may accept payments over the Internet.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" (also known as an authorization entity) may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the user.

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may comprise one or more computational apparatuses and may use any of a variety of computing structures, arrangements, and compilations for servicing the requests from one or more client computers.

FIG. 1 shows a block diagram of a system 100 according to embodiments of the present invention. FIG. 1 includes a user device 104, an access device 106, a resource provider computer 108, a transport computer 110, a processor server computer 112 associated with a database 118, an authorization computer 114A, and an authorization computer 114B. In some embodiments, user device 104 may be operated by a user (e.g., consumer) conducting a transaction with a resource provider associated with resource provider computer 108. Any of the devices and computers in FIG. 1 may be in operative communication with each other through any suitable communication channels or communications networks.

Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

User device 104 may be operated by a user and may be capable of communicating information with other devices (e.g., access device 106). User device 104 can include a processor, a memory, input devices, and output devices, operatively coupled to the processor. Some non-limiting examples of user device 104 may include mobile devices (e.g., cellular phones, keychain devices, personal digital assistants (PDAs), pagers, notebooks, laptops, notepads, wearable devices (e.g., smart watches, fitness bands, jewelry, etc.), automobiles with remote communication capabilities, personal computers, payment cards (e.g., smart cards, magnetic stripe cards, etc.), and the like.

Access device 106 may be any suitable device that provides access to a remote system. Access device 106 may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. Access device 106 may use any suitable contact or contactless mode of operation to send or receive data from, or associated with, user device 104.

In some embodiments, where access device 106 may comprise a POS terminal, any suitable POS terminal may be used and can include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

Figure 2:
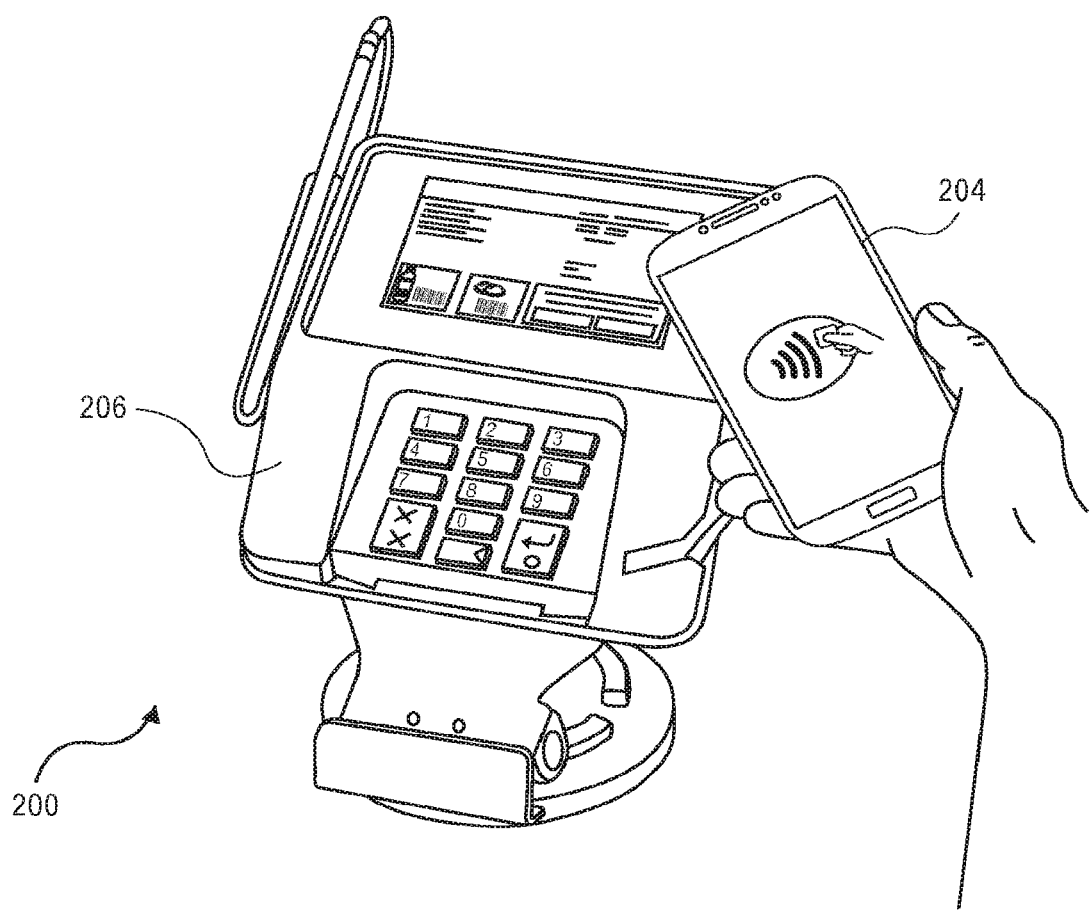
FIG. 2 shows a point-of-sale terminal system according to embodiments of the present invention.

FIG. 2 shows an exemplary system 200 in which a user device 204 and an access device 206 may communicate with each other over a wireless network. A user operating user device 204 may hover it over access device 206 during a transaction, which may trigger transaction information to be communicated between user device 204 and access device 206. User device 204 may share similar characteristics to those of user device 104, and access device 206 may share similar characteristics to those of access device 106.

User device 204 may comprise a contactless element that may be capable of transferring and receiving data using a near-field communications (NFC) capability (or NFC medium) typically in accordance with a standardized protocol or data transfer mechanism (e.g., ISO 14443/NFC). User device 204 may support contactless transactions using the EMV contactless communication protocol (EMV-CCP), which is based on ISO 14443, in order to interact with access devices, such as access device 206. This capability may typically be met by implementing NFC. The NFC capability of user device 204 may be enabled by an embedded NFC chip or by the addition of an external memory card or accessory that contains the NFC chip. NFC capability is a short-range communications capability, such as RFID, Bluetooth®, infra-red, or other data transfer capability that can be used to exchange data between the user device 204 and access device 206. Thus, user device 204 may be capable of communicating and transferring data and/or control instructions via both cellular network and near-field communications capability.

Referring back to FIG. 1, access device 106 may also be utilized for communicating with other systems. For example, access device 106 may communicate with resource provider computer 108, transport computer 110, processor server computer 112, authorization computer 114A, authorization computer 114B, or any other suitable system. Access device 106 may generally be located in any suitable location, such as at the location of a resource provider associated with resource provider computer 108. In some embodiments, access device 106 may receive data from user device 104 for a remote transaction (e.g., e-commerce transaction) and may forward the received data to an appropriate entity.

Resource provider computer 108 may be a device that is associated with a resource provider. The resource provider may engage in transactions, sell goods or services, or provide access to goods or services to the user associated with user device 104. Resource provider computer 108 may accept multiple forms of payment and may be associated with multiple tools to conduct different types of transactions. For example, resource provider computer 108 may be associated with access device 106 and communicate information to and from access device 106. In some cases, resource provider computer 108 may host a website or application associated with the resource provider through which the user may make a transaction. In some embodiments, resource provider computer 108 may be known as a merchant computer associated with a merchant.

Transport computer 110 may be a device that can transmit information between entities. Transport computer 110 may be associated with resource provider computer 108, and may manage authorization requests on behalf of resource provider computer 108. In some cases, transport computer 110 may be an acquirer computer associated with an acquirer.

Processor server computer 112 may include data processing subsystems, networks, and operations used to support and deliver authorization services, exception file services, and clearing and settlement services. For example, processor server computer 112 may comprise a server coupled to a network interface (e.g., by an external communication interface), and databases of information. In some cases, processor server computer 112 may be a transaction processing network (e.g., payment processing network). An exemplary processing network may include VisaNet™. Processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Processor server computer 112 may use any suitable wired or wireless network, including the Internet. In some embodiments, processor server computer 112 may be in communication with database 118. Further details regarding characteristics of processor server computer 112 can be found in the description below regarding FIG. 3.

Database 118 may comprise any information that may be utilized by processor server computer 112 or provided by processor server computer 112 to another entity for transaction processing. In some cases, database 118 may comprise a plurality of databases. For example, database 118 may include one or more of a data set mapping database, a fraud information database, a historical account profile database, a token database, or other database. Each database may be a conventional, fault tolerant, relational, scalable, secure database such as those commercially available from Oracle™ or Sybase™. In some embodiments, any of the databases may be combined into a single database, or may be separated into multiple databases. In some embodiments, database 118 may reside at processor server computer 112.

Authorization computer 114A may be a device associated with an authorizing entity. Authorization computer 114A may authorize an entity to conduct a transaction or to receive access to goods or services on behalf of the authorizing entity. In some cases, authorization computer 114A may receive and process an authorization request message, as well as generate and transmit an authorization response message. In some embodiments, authorization computer 114A may be an issuer computer. The issuer computer is typically a computer run by a business entity (e.g., a bank) that may have issued the payment (credit/debit) card, account numbers or payment tokens used for the transactions. Some issuer systems can perform both issuer computer and acquirer computer functions. When a transaction involves a payment account associated with the issuer computer, the issuer computer may verify the account and respond with an authorization response message to the acquirer computer that may be forwarded to the corresponding access device, if applicable. Authorization computer 114B may be a device associated with another authorizing entity. It is understood that authorization computer 114B may have similar characteristics to those described for authorization computer 114A.

In some cases, at a later time (e.g., at the end of the day), a clearing and settlement process can occur between transport computer 110, processor server computer 112, and authorization computer 114A or authorization computer 114B.

Figure 3:
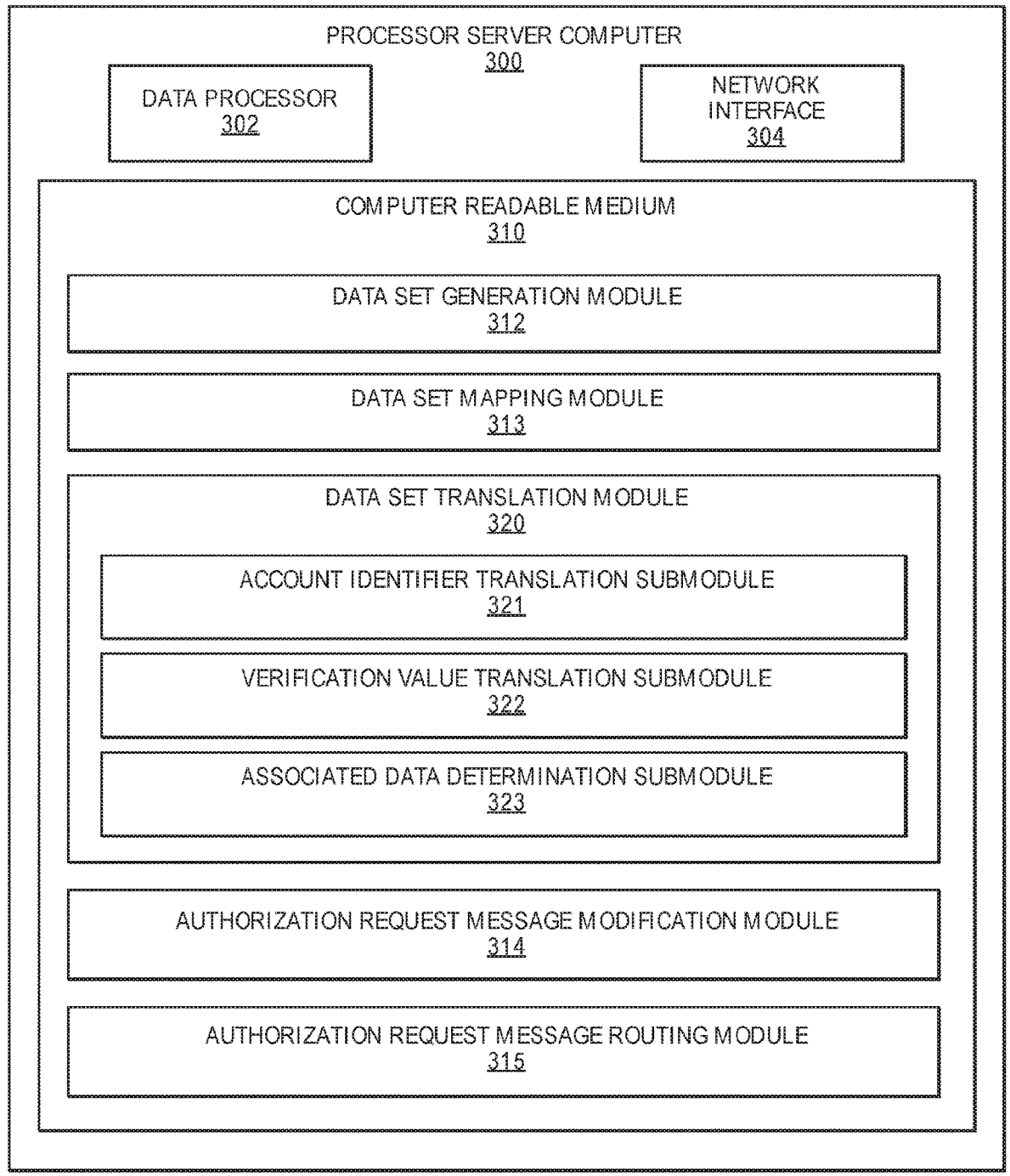
FIG. 3 shows a block diagram of some components that may be in an exemplary processor server computer according to embodiments of the present invention.

FIG. 3 shows a block diagram of some components that may be in an exemplary processor server computer 300 according to embodiments of the present invention. Processor server computer 300 comprises a data processor 302, a network interface 304, and a computer readable medium 310. The computer readable medium 310 may comprise a number of software modules including a data set generation module 312, a data set mapping module 313, a data set translation module 320, an authorization request message modification module 314, and an authorization request message routing module 315. Data set translation module 320 may comprise an account identifier translation submodule 321, a verification value translation submodule 322, and an associated data determination submodule 323. While not explicitly shown in FIG. 3, in some cases, processor server computer 300 may comprise one or more databases. Some exemplary databases are described in more detail with respect to FIG. 6.

It is noted that other modules and submodules may also reside on the computer readable medium 310. Examples of additional modules may include an authorization module for processing and routing authorization response messages, a clearing and settlement module for processing and routing clearing messages and performing settlement between parties, data extraction (e.g., for retrieving data from external data sources such as databases) modules, data storage modules, and message modification modules. Each module or submodule shown in processor server computer 300 may be combined with any of the additional modules as appropriate.

Each module in processor server computer 300 may comprise one or submodules, where each submodule may comprise one or more functions implemented by code, executable by data processor 302.

Processor server computer 300 may include data processor 302 (e.g., a microprocessor) for processing functions of processor server computer 300. Data processor 302 may include hardware within processor server computer 300 that can carry out instructions embodied as code in a computer-readable medium. In some cases, data processor 302 may be a central processing unit (CPU). As used herein, a data processor can include a single-core processor, a plurality of single-core processors, a multi-core processor, a plurality of multi-core processors, or any other suitable combination of hardware configured to perform arithmetical, logical, and/or input/output operations of a computing device.

Processor server computer 300 may include a network interface 304, which may enable processor server computer 300 to communicate data to and from another device. Network interface 304 may be any suitable combination of hardware and software that enables data to be transferred to and from processor server computer 300. Some examples of network interface 304 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 304 may include Wi-Fi™.

Data transferred via network interface 304 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 304 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Data set generation module 312 may comprise computer code that enables, in conjunction with data processor 302, creation of data sets to be utilized for conducting transactions. In some embodiments, each of the data sets may be associated with a different account, where each data set comprises an account identifier. In some cases, the account may be a card account, where the account identifier is in the form of an account number (e.g., PAN).

In some embodiments, data set generation module 312 may generate, in conjunction with data processor 302, a data set based on a previous data set. For example, an account may be associated with a first data set comprising a first account identifier and a first verification value. The first data set may be meant to be processed by a first authorization computer associated with a first authorization entity. Data set generation module 312 may then generate, with data processor 302, a second data set comprising a second account identifier, where the second data set may be generated based on information in the first data set. The second data set may also be associated with the same account. The second data set may be meant to be utilized by a second authorization computer associated with a second authorization entity.

In some embodiments, data set generation module 312 may generate, in conjunction with data processor 302, the second account identifier by replacing a first authorization entity identifier in the first account identifier with a second authorization entity identifier. In an exemplary case in which the first and second account identifiers are card account numbers, the first authorization entity identifier may be a bank identification number (BIN) associated with a first authorization entity and the second authorization entity identifier may be a BIN associated with a second authorization entity. In some cases, data set generation module 312 may replace, in conjunction with data processor 302, only the first authorization entity identifier in the first account identifier when generating the second account identifier. In other cases, data set generation module 312 may replace, in conjunction with data processor 302, the first authorization entity identifier as well as other information in the first account identifier when generating the second account identifier. For example, data set generation module 312 may generate, with data processor 302, any suitable new account number that includes the second authorization entity identifier as the second account identifier.

Upon generation of the second account identifier, data set generation module 312 may send, in conjunction with data processor 302, the second account identifier to the second authorization entity. In some embodiments, the second account identifier can be sent along with other identification information regarding the user associated with the second account identifier. This can enable the second authorization entity to recognize that the second account identifier was generated, as well as recognize the user associated with second account identifier. Thus, when a transaction in conducted using the second account identifier, the second authorization entity can charge the transactions to the user associate with the second account identifier.

Data set mapping module 313 may comprise computer code that enables, in conjunction with data processor 302, mapping of associated data sets. For example, data set mapping module 313, with data processor 302, may receive a newly generated data set from data set generation module 312 along with information indicating a previously generated data set associated with the newly generated data set. In some cases, the newly generated data set may have been generated based on the previously generated data set. Data set mapping module 313 may store information indicating a mapping between the newly generated data set and the previously generated data set in a database that is in communication with processor server computer 300. In some embodiments, the information stored in the database may be such that both the newly generated data set and the previously generated data set are stored in the same record of the database. In some cases, the record may also store an identifier that may be utilized to query the database. For example, the identifier may be an account identifier of the newly generated data set. In some cases, the previously generated data set may correspond to a first authorization entity and the newly generated data set may correspond to a second authorization entity.

Data set mapping module 313, with data processor 302, may further store any suitable additional information related to the associated data sets in the database. In some embodiments, the additional information may include timestamps indicating the times at which data sets were generated, information related to the authorization entities indicated by authorization entity identifiers in the data sets, and other relevant data. In some cases, the additional information may include historical data (e.g., fraud information, etc.) associated with the previously generated data set. In some cases, data set mapping module 313, with data processor 302, may obtain such historical data from a database in communication with processor server computer 300. In other cases, data set mapping module 313, with data processor 302, may receive the historical data from data set generation module 312 or data set translation module 320.

Data set translation module 320 may comprise computer code that enables, in conjunction with data processor 302, conversion of one data set to another during authorization processing. Data set translation module 320 may comprise account identifier translation submodule 321, verification value translation submodule 322, and associated data determination submodule 323. Typically, processor server computer 300 may receive an authorization request message comprising a data set during authorization processing. Processor server computer 300 may send an instruction to data set translation module 320 to determine whether the data set should be translated and if so, translate the data set appropriately before proceeding further with the authorization processing.

Account identifier translation submodule 321 may comprise computer code that enables, in conjunction with data processor 302, conversion of one account identifier to another during authorization processing. In some embodiments, account identifier translation submodule 321, with data processor 302, may receive an account identifier included in an authorization request message. In other embodiments, account identifier translation submodule 321, with data processor 302, may receive the authorization request message and extract the account identifier. For illustrative purposes, the account identifier is referred to a first account identifier below.

Upon obtaining the first account identifier, account identifier translation submodule 321, with data processor 302, may query a database in communication with processor server computer 300 to determine whether the first account identifier is mapped to a second account identifier. The database may be the same database updated by data set mapping module 313 as described above. In some embodiments, the first account identifier may correspond to a first authorization entity and the second account identifier may correspond to a second authorization entity. Additionally, in some cases, the mapping of the first account identifier to the second account identifier may indicate that the first account identifier is obsolete.

If the query to the database does not return a result, this can indicate that the database does not store information indicating that the first account identifier is associated with another account identifier. Account identifier translation submodule 321, with data processor 302, may communicate to authorization request message modification module 314 that no modifications are needed for the authorization request message and that authorization processing should proceed as normal.

If the query to the database does return a result, this can indicate that the first account identifier is associated with a second account identifier. Account identifier translation submodule 321, with data processor 302, may retrieve the second account identifier and communicate to authorization request message modification module 314 that the authorization request message is to be updated with the second account identifier and that authorization processing should be altered based on the second account identifier. In some embodiments, account identifier translation submodule 321, with data processor 302, may also notify verification value translation submodule 322 and associated data determination submodule 323 that information is to be processed based on the second account identifier.

Verification value translation submodule 322, with data processor 302, may convert additional information utilized for authorization processing based on the determination that the first account identifier is associated with the second account identifier. In an exemplary case, the authorization request message may be for a card transaction in which the first account identifier included in the authorization request message is a first card account number issued by a first authorization entity (e.g., first issuer). The associated second account identifier may be a second card account number issued by a second authorization entity (e.g., second issuer). Certain transaction security values that are typically generated using the first account identifier may be re-generated based on the second account identifier. In some cases the transaction security values may include card verification values (e.g., CVV, CVV2, dCVV), cardholder authentication verification values (CAVV), cryptograms (e.g., authorization request cryptogram (ARQC), authorization response cryptogram (ARPC)), or a PIN number.

Verification value translation submodule 322, with data processor 302, may verify verification values associated with the first account identifier before proceeding with authorization processing using the second account identifier. For example, for a magnetic stripe transaction conducted with a card, verification value translation submodule 322, with data processor 302, may receive a CVV value associated with the first account identifier encoded in the magnetic stripe. In some embodiments, verification value translation submodule 322, in conjunction with data processor 302, may derive a CVV value using at least the first account identifier, expiration date, service code, and a key of the first authorization entity and determine, with data processor 302, whether the derived CVV value matches the received CVV value. If the CVV value cannot be verified, authorization processing may be terminated. In some embodiments, the CVV may also be generated based on a timestamp or a transaction amount added to a timestamp. However, if the CVV value can be verified, verification value translation submodule 322, with data processor 302, may proceed to generate new verification values based on the second account identifier associated with the first account identifier.

Verification value translation submodule 322, in conjunction with data processor 302, may generate new verification values based on the second account identifier. For example, verification value translation submodule 322, with data processor 302, may generate a new CVV using the second account identifier, expiration date, service code, and a key of the second authorization entity. In some embodiments, the CVV may also be generated based on a timestamp of a transaction amount added to a timestamp. Verification value translation submodule 322, with data processor 302, may communicate the new CVV to authorization request message modification module 314 to be utilized for authorization processing. The new CVV may be generated in a format such that it can be verified downstream by the second authorization entity associated with the second account identifier using typical verification methods conducted by authorization entities. Hence, the second authorization entity may not have alter its system based on translation processing conducted by processor server computer 300 and instead may conduct authorization processing as usual.

It is understood that other verification values besides those described above may also be translated by verification value translation submodule 322 using a similar method as described above. Thus, verification values typically verified by the first authorization entity may be verified instead by processor server computer 300 and new verification values can be generated such that they can be verified by the second authorization entity.

In some embodiments, verification value translation submodule 322, in conjunction with data processor 302, may generate dynamic values. An exemplary dynamic value may be a dynamic CVV (dCVV), which may be generated each time a transaction is conducted with an integrated circuit credit card or smart card. The dCVV may be generated using a changing value, such as an application transaction counter (ATC) maintained by a memory on a payment card. The ATC may be incremented upon each transaction and in some embodiments, may be combined with a cryptogram, digital signature, or hash value.

One exemplary method for generating a dCVV is described. Initially, a numeric string may be created by overlaying the ATC over the corresponding left-most digits of an account identifier, which may be a card number (e.g., PAN) in this case. The numeric string may be concatenated on the right with an expiration date and service code associated with the account identifier. In some embodiments, the numeric string my further may further be padded to a certain predetermined length, such as 128-bits. The numeric string may then be bisected into a first 64 bits and a second 64 bits. The first 64 bits may be encrypting using a first key, which may then be exclusively OR'ed with the second 64 bits. The result may then be encrypted with a second key, further decrypted using a third key, and further encrypted by a fourth key.

The resulting block may then be further processed in 4-bit grouping. First, each value ranging from 0 to 9 in the resulting block may be extracted and placed in a new numeric string in the same sequence that they appear in the resulting block. Next, each value ranging from hexadecimal values A to F in the resulting block may be extracted, where each value may be decimalized by subtracting from it hexadecimal value A. The decimalized values may be concatenated to the right of the new numeric string. In some embodiments, the three most-significant (e.g., leftmost) 4-bit groupings may make up the dCVV.

Verification value translation submodule 322, in conjunction with data processor 302, may generate a dCVV utilizing the first account identifier as described above and determine, with data processor 302, whether the generated dCVV matches a first dCVV received for a transaction. If the first dCVV can be verified, verification value translation submodule 322, in conjunction with data processor 302, may generate a second dCVV utilizing the second account identifier. The second dCVV may be verified by the second authorization entity associate with the second account identifier.

Associated data determination submodule 323, in conjunction with data processor 302, may determine data associated with the first account identifier. Associated data determination submodule 323, with data processor 302, may access a database storing historical data associated with the first account identifier. In some cases, the historical data may be aggregated during previous authorization processing conducted using the first account identifier. In an exemplary case, the historical data may include fraud information (e.g., fraud scores, risk level, fraud patterns, etc.) associated with the first account identifier. In some embodiments, the historical data may include historical transaction data (e.g., timestamps, frequency, location data, transaction amounts, merchant data, etc.), or any analysis information (e.g., average transaction amount, typical transaction locations and times, etc.) determined based on the historical transaction data. In some embodiments, associated data determination submodule 323, with data processor 302, may provide some or all retrieved data related to the first account identifier to authorization request message modification module 314 during authorization processing. Associated data determination submodule 323, in conjunction with data processor 302, enables information that is originally associated with the first account identifier to be made available for authorization processing utilizing the second account identifier.

Authorization request message modification module 314, in conjunction with data processor 302, may modify an authorization request message to include a translated data set. Authorization request message modification module 314, with data processor 302, may receive an indication from account identifier translation submodule 321 that the first account identifier is mapped to the second account identifier. Subsequently, authorization request message modification module 314, with data processor 302, may substitute the first account identifier with the second account identifier in the authorization request message. Additionally, authorization request message modification module 314, with data processor 302, may receive a second verification value (e.g., CVV) from verification value translation submodule 322 associated with the second account identifier. Subsequently, authorization request message modification module 314, with data processor 302, may substitute a first verification value associated with the first account identifier with the second generated verification value in the authorization request message.

Further, in some embodiments, authorization request message modification module 314, with data processor 302, may receive data associated with the first account identifier from associated data determination submodule 323. In some cases, authorization request message modification module 314, with data processor 302 may include the received data in the authorization request message to enable communication of the data to the authorization entity that is to receive the authorization request message. Hence, authorization request message modification module 314, with data processor 302, may modify the authorization request message so that it can be processed by the second authorization entity associated with the second account identifier instead of the first authorization entity associated with the first account identifier.

Authorization request message modification module 314, in conjunction with data processor 302, may modify the authorization request message based on the format of the authorization request message. For example, in some cases, the authorization request message may have an ISO-standard message format. Authorization request message modification module 314, with data processor 302, may modify the authorization request message to include the translated data set including the second account identifier and new verification value in appropriate fields of the authorization request message (e.g., PAN field, CVV field, etc.). This can enable the authorization request message to be processed as usual during authorization processing, despite including the translated values.

Authorization request message routing module 315, in conjunction with data processor 302, may enable an authorization request message to be routed to an appropriate authorization entity. Authorization request message routing module 315, with data processor 302, may determine the account identifier included in the authorization request message. Authorization request message routing module 315, with data processor 302, may further determine an authorization entity identifier from the account identifier. Authorization request message routing module 315, in conjunction with data processor 302, may send the authorization request message to the authorization entity associated with the authorization entity identifier. In an exemplary case, the account identifier may be a card account number and the authorization entity identifier may be a BIN number associated with the authorization entity, or issuer, that issued the card account number. Based on the determined BIN number, authorization request message routing module 315, with data processor 302, may send the authorization request message to the issuer for authorization processing.

A method according to the embodiments of the invention can be described with respect to FIG. 1. User device 104 may be operated by a user that is conducting a transaction with resource provider computer 108. In this exemplary case, user device 104 may be a payment card originally issued by authorization computer 114A. Hence, the card number associated with user device 104 may be associated with authorization computer 114A and authorization processing responsibilities for transactions conducted with the payment card may be channeled to authorization computer 114A. However, under certain circumstances, such authorization processing responsibilities for user device 104 may be transferred from authorization computer 114A to authorization computer 114B. The description below describes authorization processing of an exemplary first transaction conducted before the transfer, as well as describes authorization processing of an exemplary second transaction conducted after the transfer.

Figure 4:
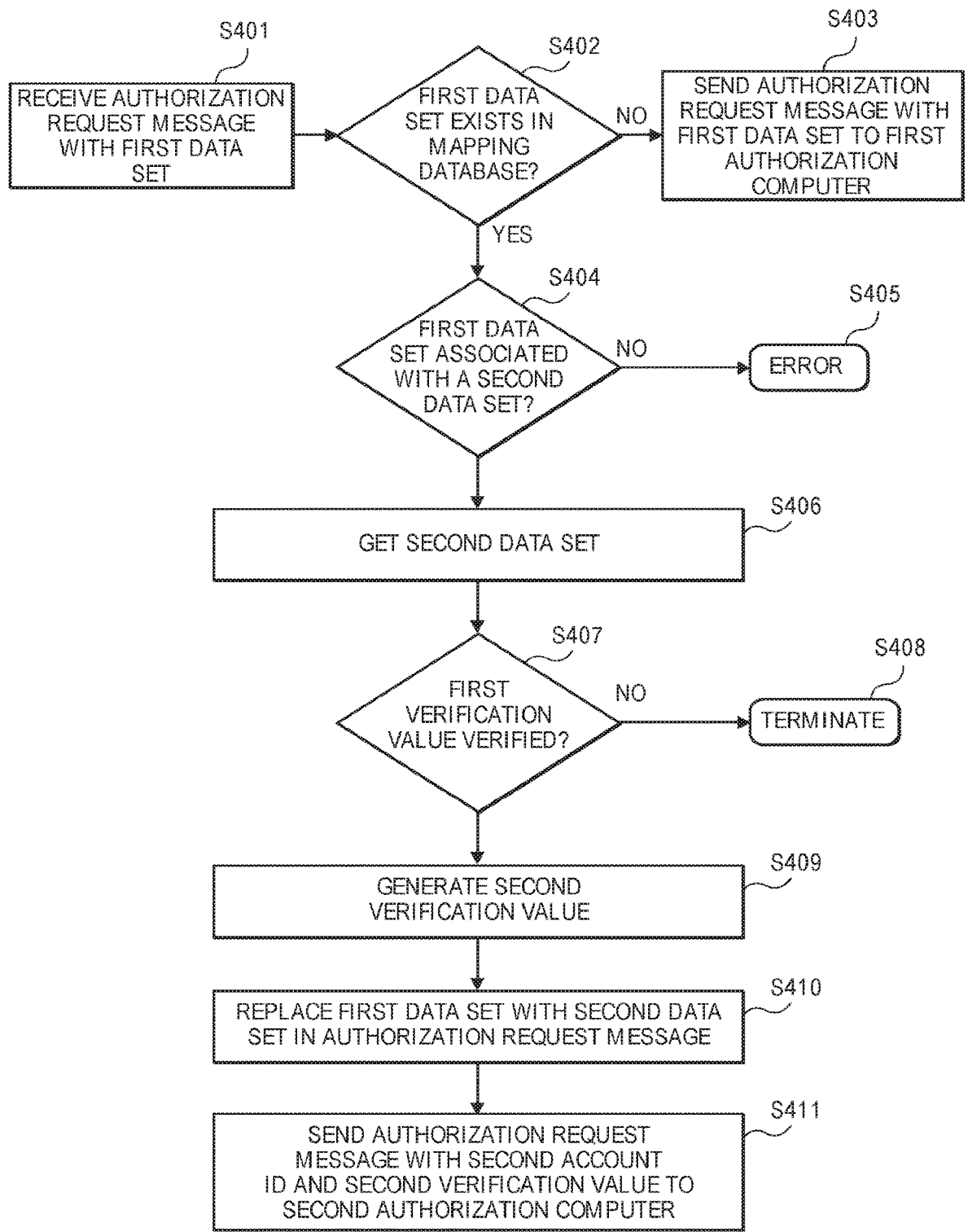
FIG. 4 shows an exemplary flow diagram of a method for processing a transaction according to embodiments of the present invention.

The exemplary first transaction conducted before the transfer of authorization processing responsibilities for user device 104 is described. The user may utilize user device 104 to conduct the transaction with resource provider computer 108. In some cases, the user may enable user device 104 to communicate by any suitable payment method (e.g., magnetic-stripe, chip, contactless, etc.) with access device 106 associated with resource provider computer 108. Some steps of the first transaction may be described with respect to S401 through S403 of flow diagram 400 shown in FIG. 4

At step S1, user device 104 may provide transaction data including data set A to access device 106. Data set A may include a first account identifier, which may be a first card account number. Data set A may also include a verification values, such as a CVV associated with the first account identifier.

At step S2, access device 106 may generate an authorization request message including the information in data set A and may send the authorization request message to resource provider computer 108. Access device 106 may include the information in data set A in appropriate fields of the authorization request message (e.g., ISO-standard data fields). In some embodiments, access device 106 may add further information in authorization request message, such as a timestamp, location data, or resource provider data associated with the transaction. Resource provider computer 108 may receive the authorization request message.

At steps S3 and S4, resource provider computer 108 may send the authorization request message to processor server computer 112 via transport computer 110. Processor server computer 112 may receive the authorization request message including data set A (S401). In some embodiments, transport computer 110 may be an acquirer computer, and processor server computer 112 may be a payment processor server computer. Processor server computer 112 may receive and process the authorization request message. In some embodiments, processor server computer 112 may first determine the account identifier included in the authorization request message.

At step S5, processor server computer 112 may determine whether the first account identifier is mapped to another account identifier in database 118 (S402). Processor server computer 112 may query database 118 for data related to the first account identifier. In this case, database 118 may not return any value since the first account identifier is not associated with another account identifier. This may indicate to processor server computer 112 that the first account identifier is a real, usable account identifier meant to be processed by authorization computer 114A associated with the authorization entity that issued the first account identifier. As a result, processor server computer 112 may not translate data set A included in the authorization request message.

At step S6A, processor server computer 112 may send the authorization request message including the information in data set A to authorization computer 114A (S403). Processor server computer 112 may route the authorization request message to authorization computer 114A based on an authorization entity identifier included in the first account identifier. In this exemplary case, the authorization entity identifier may be a BIN corresponding to authorization computer 114A.

Authorization computer 114A may receive the authorization request message and determine whether to authorization the transaction. In some embodiments, the authorization decision may be made based on past transaction data associated with the first account identifier. For example, if the past transaction data indicates a low likelihood of fraud for the current transaction, authorization computer 114A may authorize the transaction. Authorization computer 114A may generate an authorization response message including the authorization decision and send the authorization response message to processor server computer 112.

At steps S7 and S8, processor server computer 112 may send the authorization response message to resource provider computer 108 via transport computer 110. Based on the authorization decision included in the authorization response message, resource provider computer 108 may determine whether to continue or terminate the transaction. In this exemplary case, the authorization decision may indicate that authorization computer 114A authorized the transaction, so resource provider computer 108 may continue processing the transaction.

At step S9, resource provider computer 108 may send a notification to access device 106 that the transaction is authorized. In some embodiments, access device 106 may show on its display indicating information in the notification, so that the user can see that the transaction was authorized.

At step S10, access device 106 may indicate that the transaction is complete. At this point, the user may retrieve user device 104. In some embodiments, resource provider computer 108 or access device 106 may provide a receipt to the user indicating that the transaction conducted using user device 104 associated with the first account identifier was completed.

The exemplary second transaction conducted after the transfer of authorization processing responsibilities for user device 104 is described. During the transfer, processor server computer 112 may generate a second account identifier and store a mapping of the first account identifier and the second account identifier in database 118. The second account identifier may be any suitable account identifier that includes an authorization entity identifier associated with authorization computer 114B. Processor server computer 112 may send the second account identifier to authorization computer 114B.

While an exemplary case in which processor server computer 112 generates the second account identifier is described above, embodiments are not so limited. In some embodiments, authorization computer 114B may generate the second account identifier and send information indicating the mapping between the first account identifier and the second account identifier to processor server computer 112. Processor server computer 112 may then store the information received from authorization computer 114B in database 118.

It is noted that despite the transfer having taken place, the user may continue to utilize the same user device 104 associated with the first account identifier in data set A for the second transaction. Some steps of the second transaction may be described with respect to S401 through S411 of flow diagram 400 shown in FIG. 4, as well as in system 500 shown in FIG. 5.

Steps S1 through S4 for the second transaction may be similar to steps S1 through S4 for the first transaction. As described, user device 104 may provide transaction data including data set A to access device 106. Data set A may include the first account identifier, which may be the first card account number. Data set A may also include a verification value, such as a CVV associated with the first account identifier. Access device 106 may generate an authorization request message including the information in data set A and may send the authorization request message to resource provider computer 108. Resource provider computer 108 may send the authorization request message to processor server computer 112 via transport computer 110. Processor server computer 112 may receive the authorization request message including data set A (S401).

At step S5, processor server computer 112 may determine whether the account identifier is mapped to another account identifier in database 118. Processor server computer 112 may query database 118 for data related to the first account identifier (S402). In this case, database 118 may return an indication that the first account identifier is mapped to the second account identifier (S404). This may indicate to processor server computer 112 that the first account identifier is obsolete and that authorization processing for the transaction is meant to be processed by authorization computer 114B. In other embodiments, if the query does not return a result, even though the first account identifier is stored in database 118, this may return an Error (S405) and the transaction may be terminated.

As a result, processor server computer 112 may translate data set A to data set B (S406). Processor server computer 112 may replace information in data set A included in the authorization request message for information in data set B (S410). Data set B may include the second account identifier and a second verification value. For example, processor server computer 112 may substitute the first account identifier with the second account identifier in the authorization request message.

Additionally, processor server computer 112 may verify the first verification value associated with the first account identifier (S407). In an exemplary case, processor server computer 112 may derive a CVV value using the first account identifier, expiration date, service code, and a key of the first authorization entity associated with the first authorization entity. Processor server computer 112 may determine whether the derived CVV value matches the first CVV value received from user device 104. If the first verification value cannot be verified, this may indicate that the transaction is potentially fraudulent and the transaction may be terminated (S408). However, if the CVV value can be verified, processor server computer 112 may proceed to generate a second new verification value based on the second account identifier associated with the second authorization entity.

Processor server computer 112 may generate the second verification value associated with the second account identifier (S409). In an exemplary case, processor server computer 112 may generate a second CVV using the second account identifier, expiration date, service code, and a key of the second authorization entity. The second CVV may be generated in a format such that it can be verified downstream by the second authorization entity associated with the second account identifier by typical verification methods utilized by authorization entities. Processor server computer 112 may substitute the first verification value with the second verification value in the authorization request message. Hence, the second authorization entity may not have alter its system based on translation processing conducted by processor server computer 112 and instead may conduct authorization processing as usual.

Further in some cases, processor server computer 112 may include additional information associated with the first account identifier in the authorization request message. In some cases, the additional data may include historical transaction data associated with the first account identifier. Although the transaction is being conducted with the second account identifier, it is useful for the second authorization entity that is to be receive the authorization request message to have access to such additional information associated with the first account identifier. An exemplary case is depicted in FIG. 5.

Figure 5:
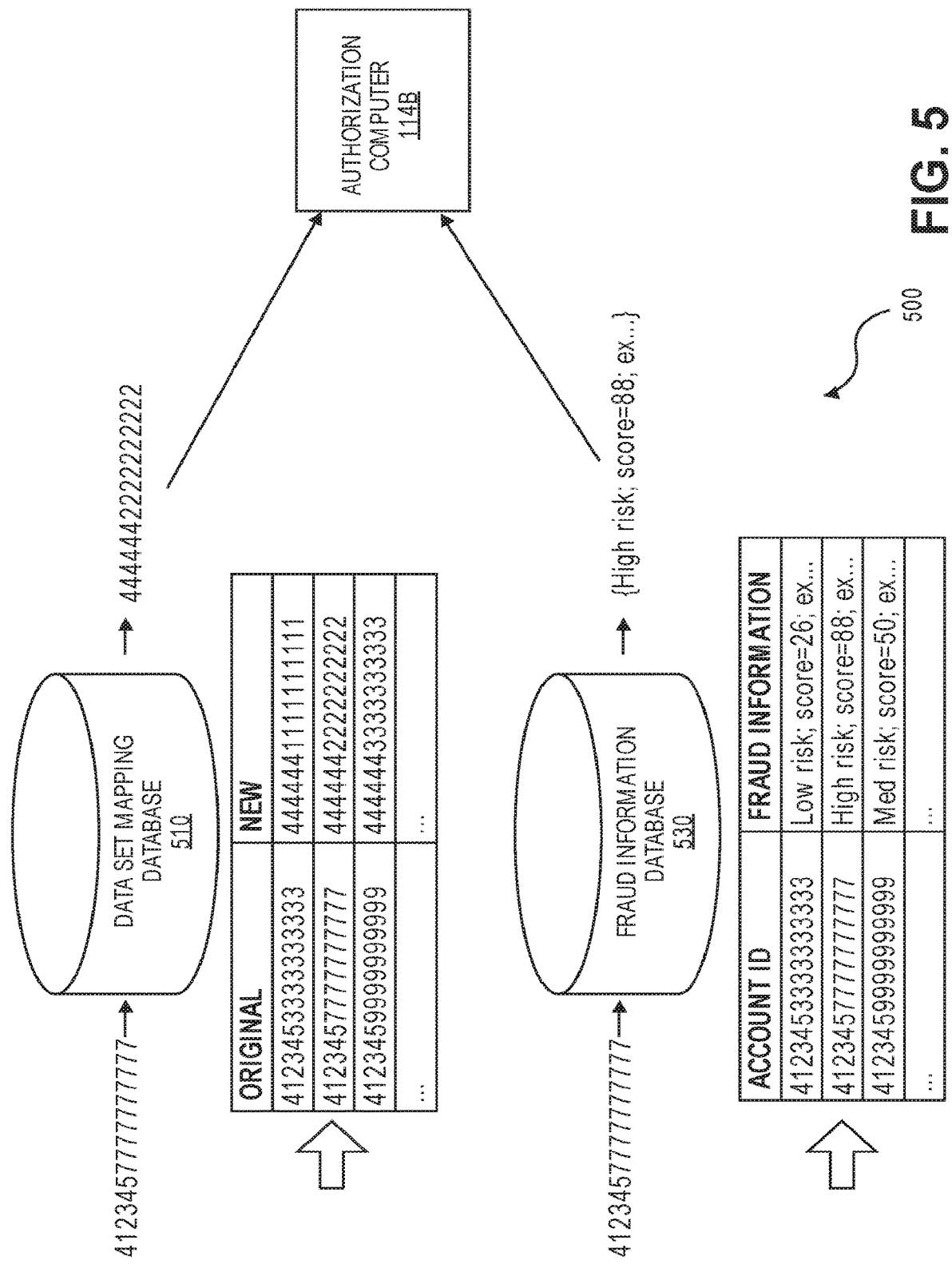
FIG. 5 shows an exemplary system for mapping a data set according to embodiments of the present invention.

FIG. 5 includes a data set mapping database 510 and a fraud information database 530. While not explicitly shown in FIG. 1, database 118 may be split up into one or more databases, which may include data bases similar to data set mapping database 510 and fraud information database 530. In some cases, fraud information database 530 may be known as a historical information database that is not necessarily limited to storing fraud information. Further, while not shown explicitly in FIG. 1 and FIG. 3, in some cases, data bases similar to data set mapping database 510 and fraud information database 530 may reside at processor server computer 112 or processor server computer 300, respectively.

Data set mapping database 510 may store a mapping of original account identifiers associated with authorization computer 114A to new account identifiers associated with authorization computer 114B. For example, data set mapping database 510 may store a mapping between the first account identifier "4123457777777777" and the second account identifier "4444442222222222," such that a query including the first account identifier by processor server computer 112 to data set mapping database 510 may return the second account identifier.

Fraud information database 530 may store historical fraud information associated with the first account identifier. In some cases, this may include fraud scores, risk levels, fraud patterns, baseline values (e.g., average transaction amount, typical transaction locations and times, etc.) that may be utilized for comparison against abnormal transactions characteristics, or other information. For example, a query to fraud information database 530 may indicate that the first account identifier is associated with a high risk level corresponding to a fraud score 88 (e.g., on a 1-100 scale).

Processor server computer 112 may provide fraud information stored in association with the first account identifier to authorization computer 114B associated with the second account identifier for authorization processing. Since embodiments of the invention enable the translation of data sets utilized for authorization processing to be handled by processor server computer 112, authorization computer 114B may communicate with processor server computer 112 to access information related to the first account identifier. This would not typically be possible, since no single entity would be able to store information linking the first account identifier with the second account identifier.

The fraud information can help authorization computer 114B make more informed authorization decision for transactions. For example, authorization computer 114B may easily recognize that the fact that the first account identifier is associated with a high risk level corresponding to a fraud score 88 may indicate that the transaction conducted using the second account identifier may also carry similar risk. As a result, authorization computer 114B may not authorize the transaction. On the other hand, If authorization compute 114B were not able to receive this fraud information from processor server computer 112, at best, authorization computer 114B may make the authorization decision based on standard thresholds. For example, authorization computer 114B may simply check whether the transaction is above a certain transaction amount, which does not produce as accurate results.

In some embodiments, authorization computer 114B may directly utilize the information stored in fraud information database 530 for making an authorization decision as described above. In other embodiments, authorization computer 114B may indirectly utilize the information received stored in fraud information database 530 for making an authorization decision. In some embodiments, authorization computer 114B may perform further fraud analyses based on information stored in fraud information database 530. For example, authorization computer 114B may take into account certain information related to the current transaction to determine whether the transaction is at risk. In one exemplary case, authorization computer 114B may determine that the current transaction is at high risk because the location of the current transaction is not typical for locations at which the user usually conducts transaction.

Referring back to FIG. 1, at step S6B, processor server computer 112 may send the authorization request message including the information in data set B to authorization computer 114B (S411). Processor server computer 112 may route the authorization request message to authorization computer 114B based on an authorization entity identifier included in the second account identifier. In this exemplary case, the authorization entity identifier may be a BIN corresponding to authorization computer 114B.

Authorization computer 114B may receive the authorization request message and determine whether to authorization the transaction. In some embodiments, the authorization decision may be made based on past transaction data associated with the first account identifier included in the authorization request message. This capability to utilize information associated with the first account identifier is advantageous because the second account identifier may not have that much historical data associated with it, especially shortly after the transfer of authorization processing responsibilities for user device 104. Typically, this lack of historical data can make it more difficult to detect potential fraud for the transaction. Instead, the transaction can be processed with the second account identifier without compromising security of the transaction. Authorization computer 114B may generate an authorization response message including the authorization decision and send the authorization response message to processor server computer 112.

Steps S7 through S10 for the second transaction may be similar to steps S7 through S10 described for the first transaction. Processor server computer 112 may send the authorization response message to resource provider computer 108 via transport computer 110. Resource provider computer 108 may send a notification to access device 106 that the transaction is authorized. In some embodiments, access device 106 may show on its display indicating information in the notification, so that the user can see that the transaction was authorized. Further, access device 106 may indicate that the transaction is complete. At this point, the user may retrieve user device 104. In some embodiments, resource provider computer 108 or access device 106 may provide a receipt to the user indicating that the transaction conducted using user device 104 associated with the first account identifier was completed.

It is understood that the descriptions of the exemplary transactions above are not limiting. Some steps described above can be performed by other suitable entities other than those described. For example, in some cases, resource provider computer 108 may generate the authorization request message instead of access device 106. Additionally, in other embodiments, user device 104 may not be a payment card, but may instead be a mobile computing device that stores a virtual card. Further, the transactions may be conducted as card-present or card-not present transactions.

Embodiments of the invention enable the user to conduct transactions utilizing their user device as usual despite the transfer of authorization processing responsibilities for their user device from one authorization computer to another authorization computer. This is advantageous since the user does not need to request generation of a new account, conduct re-registration processes (e.g., enter user information, generate authentication information, etc.) to generate a new account specifically for a new authorization computer, or in some cases, wait to receive a physical user device (e.g., plastic payment card) associated with the new account.

Embodiments of the invention also provide benefits for the resource provider computer. For example, in some cases, the user's original account may be associated with the resource provider computer (e.g., a resource provider branded credit card). Embodiments of the invention reduce the chance that the resource provider associated with the resource provider computer will lose the user as a customer because there is no concern that the user may not follow through with activating a new account. Instead, the user is not exposed to backend processing conducted as a result of the transfer authorization processing responsibilities of their user account from one authorization entity to another authorization entity and may continue to utilize their user account as usual.

Embodiments of the invention also provide benefits for the processor server computer. For example, in some cases, there is a risk that upon receiving authorization processing responsibilities for user accounts, an authorization entity may reissue the user accounts to be hosted by another processor server computer. Embodiments of the invention eliminate the likelihood that this will occur, since the processor server computer is the entity that generates the new user account identifiers, rather than the authorization entity.

Embodiments of the invention also benefit the authorization computer (e.g., authorization computer 114B) for several reasons. A typical transfer of authorization processing responsibilities for a user account may result in the authorization computer having to provide resources for generating a new account or user device to the user. For example, the authorization computer may have to host and manage a website through which the user may request to generate a new account. This can utilize computing resources (e.g., memory, processing power, etc.) of the authorization computer that could have been utilized elsewhere. Additionally, the authorization computer may bear the expense of issuing new user devices (e.g., plastic payment cards), which can be significant for a large number of user devices. In contrast, embodiments of the invention enable the authorization computer to conduct authorization processing for the transaction as usual, without having to allocate such resources and expenses.

Further, embodiments of the invention increase security. For example, upon issuance of new accounts, the corresponding authorization entity may typically not have access to any information regarding prior user accounts that may be associated with a different authorization entity. This can lower quality of authorization processing, since there may not be enough information to measure whether conducted transactions deviate from previous usage patterns. Embodiments of the invention solve this problem by enabling the processor server computer to manage translation of data sets. This way, the processor server computer, which has access to and can retrieve historical information originally associated with the first account identifier, can enable the historical information to be made available to during authorization processing involving the second authorization entity associated with the second account identifier. The second authorization entity may then be capable of performing analyses for the second account identifier based on a historical profile associated with the first account identifier.

Preventing lowering in quality of authorization processing by enabling the authorization entity associated with the second identifier to access historical information associated with the first account identifier can also improve the performance of the computer system as a whole. For example, situations in which too many transactions are mistakenly authorized can result in additional processing, such as for chargebacks, which typically increases the load on the computer system as a whole. Preventing lowering in quality of authorization processing can also help avoid situations in which too many transactions are unnecessarily declined. This typically increases processing that needs to performed by the computer system because transactions need to re-processed. For example, authorization request and response messages may need to be reprocessed in a similar manner to that described for steps S1 through S10 for the first transaction by multiple transaction entities (e.g., including access device 106, resource provider computer 108, transport computer 110, processor server computer 112, and authorization computer 114B of FIG. 1). Hence, embodiments of the invention avoid the situation typically faced as a result of a transfer of authorization processing responsibilities of accounts from one authorization entity to another, which is that security is decreased and the processing load on the computer system is unnecessarily increased.

Embodiments of the invention also increase security because the likelihood that stolen data can be utilized in an appropriate context is decreased. For example, account identifiers reissued using conventional methods may be processed during authorization processing from start to end in a typical manner (e.g., from user device to authorization computer). If these account identifiers were to be intercepted by a malicious party at any point in the system, it is possible that they may be utilized for attempts to conduct fraudulent transactions while posing as the user operating the corresponding user device.

However, embodiments of the invention process a first account identifier for one part of authorization processing (e.g., from user device to processor server computer) and a second account identifier for another part of authorization processing (e.g., from processor server computer to authorization computer). Hence, if a malicious party were to intercept the second account identifier and attempt to use it while posing as a user for a transaction, they would not be successful. This is because the system may detect that the second account identifier is outside of its expected domain of use. For example, the second account identifier should be available upon translation by processor server computer, and not known by the user utilizing their user device associated with the first account identifier. An attempt to directly utilize the second account identifier for a transaction may indicate that someone is attempting to utilize the second account identifier encoded on a fake card or in a card-not-present transaction. Hence, embodiments of the invention decrease the chance that a malicious entity can utilize compromised data for fraud.

It is understood that while descriptions above include examples of financial authorization processing, embodiments are not so limited. Embodiments of the invention may be applied to other authorization processing outside of financial contexts. One exemplary case includes authorization of airline tickets, which may each be associated with a ticket number. In some cases, each ticket number may comprise a ticket code (e.g., first three digits) that indicates a corresponding airline company. A user may have multiple airline tickets for a trip from destination A to B to C. While each airline ticket may be associated with a different airline company and thus a different ticket code, all the tickets may be wrapped under a common reservation number associated with a travel agency. Thus, when the user presents any of their airline tickets to an access device (e.g., access device 106) at the airport, the access device may communicate the corresponding ticket number with a server computer (e.g., processor server computer 112), which can translate the ticket number into the reservation number associated with the travel agency. The server computer, or other separate authorization computer (e.g., authorization computer 114B) in communication with the server computer, may authorize the use of the airline ticket.

Additional methods and processes may be included within the above methods and may be recognized by one of ordinary skill in the art, in light of the description herein. Further, in some embodiments of the present invention, the described methods herein may be combined, mixed, and matched, as one of ordinary skill would recognize.

A computer system may be utilized to implement any of the entities or components described above. Subsystems of the computer system may be interconnected via a system bus. Additional subsystems may include a printer, a keyboard, a fixed disk (or other memory comprising computer readable media), a monitor, which is coupled to a display adapter, and others. Peripherals and input/output (I/O) devices, which couple to an I/O controller (which can be a processor or other suitable controller), can be connected to the computer system by any number of means known in the art, such as by a serial port. For example, the serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising performing, by a server computer:
   receiving, from an access device, an authorization request message with a first data set comprising a first account identifier corresponding to a first authorization computer of a first authorization entity;
   determining that the first data set is associated with a second data set comprising a second account identifier corresponding to a second authorization computer of a second authorization entity; and
   routing, to the second authorization computer, the authorization request message with the second data set, wherein the method further comprises:
   accessing a database comprising fraud information associated with the first data set;
   upon determining that the first data set is associated with the second data set, retrieving the fraud information associated with the first data set; and
   sending the fraud information related to the first data set with the authorization request message to the second authorization computer, wherein the second authorization computer utilizes the fraud information to determine whether to validate the authorization request message.

2. The method of claim 1, wherein the database is a first database, and the method further comprises:
   generating the second data set comprising the second account identifier corresponding to the second authorization entity; and
   storing the second data set in association with the first data set in a second database comprising a mapping between data sets corresponding to the first authorization entity and data sets corresponding to the second authorization entity.

3. The method of claim 2, further comprising:
   after receiving the authorization request message, accessing the second database comprising the mapping between data sets corresponding to the first authorization entity and data sets corresponding to the second authorization entity;
   querying the second database for the first data set; and
   receiving from the second database an indication that the first data set is associated with the second data set.

4. The method of claim 1, wherein the first account identifier comprises a primary account number.

5. The method of claim 1, wherein the access device comprises a user device reader.

6. The method of claim 1, wherein the authorization request message is received from the access device via a transport computer.

7. The method of claim 6, wherein the authorization request message is received from the access device, after the access device receives the first data set from a user device associated with a user.

8. The method of claim 1, wherein the first account identifier includes a first authorization entity identifier associated with the first authorization entity and the second account identifier includes a second authorization entity identifier associated with the second authorization entity.

9. The method of claim 8, wherein the method further comprises:
obtaining the second account identifier;
determining the second authorization entity identifier included in the second account identifier; and
determining that the second authorization entity identifier is associated with the second authorization entity.

10. The method of claim 1, wherein the database stores a mapping between the first account identifier and the second account identifier.

11. A server computer comprising:
a processor; and
a non-transitory computer readable medium coupled to the processor, the non-transitory computer readable medium comprising code executable to perform a method comprising:
receiving, from an access device, an authorization request message with a first data set comprising a first account identifier corresponding to a first authorization computer of a first authorization entity;
determining that the first data set is associated with a second data set comprising a second account identifier corresponding to a second authorization computer of a second authorization entity; and
routing, to the second authorization computer, the authorization request message with the second data set, wherein the method further comprises:
accessing a database comprising fraud information associated with the first data set;
upon determining that the first data set is associated with the second data set, retrieving the fraud information associated with the first data set; and
sending the fraud information related to the first data set with the authorization request message to the second authorization computer, wherein the second authorization computer utilizes the fraud information to determine whether to authorize the authorization request message.

12. The server computer of claim 11, wherein the fraud information comprises historical fraud information.

13. The server computer of claim 11, wherein the fraud information includes fraud patterns associated with the first account identifier.

14. The server computer of claim 11, wherein the fraud information comprises fraud scores.

15. The server computer of claim 11, wherein the method further comprises:
receiving an authorization response message from the second authorizing computer in response to sending the authorization request message to the second authorizing computer.

16. The server computer of claim 15, wherein the method further comprises:
transmitting the authorization response message to the access device.

17. The server computer of claim 16, wherein the authorization request message comprises a card verification value.

18. The server computer of claim 11, wherein the first account identifier includes a first authorization entity identifier associated with the first authorization entity and the second account identifier includes a second authorization entity identifier associated with the second authorization entity.

19. A system comprising:
a server computer comprising a processor, and a non-transitory computer readable medium coupled to the processor, the non-transitory computer readable medium comprising code executable by the processor to perform a method comprising receiving, from an access device, an authorization request message with a first data set comprising a first account identifier corresponding to a first authorization computer of a first authorization entity, determining that the first data set is associated with a second data set comprising a second account identifier corresponding to a second authorization computer of a second authorization entity, and routing, to the second authorization computer, the authorization request message with the second data set, wherein the method further comprises, accessing a database comprising fraud information associated with the first data set, upon determining that the first data set is associated with the second data set, retrieving the fraud information associated with the first data set, and sending the fraud information related to the first data set with the authorization request message to the second authorization computer, wherein the second authorization computer utilizes the fraud information to determine whether to authorize the authorization request message; and
the access device.

20. The system of claim 19, further comprising:
the second authorization computer.

* * * * *